United States Patent [19]

Moncheaux et al.

[11] Patent Number: 4,732,725
[45] Date of Patent: Mar. 22, 1988

[54] PROCESS AND DEVICE FOR THE PRODUCTION OF A SAFETY PANE

[75] Inventors: Michel-Jean Moncheaux, Compiégne; Francois de Toytot, Thourotte, both of France

[73] Assignee: Saint-Gobain Vitrage, Aubervilliers, France

[21] Appl. No.: 821,255

[22] Filed: Jan. 15, 1986

[30] Foreign Application Priority Data

Jan. 15, 1985 [FR] France ................................ 85 00497

[51] Int. Cl.$^4$ ........................ B29C 45/16; B32B 27/40
[52] U.S. Cl. ..................................... 264/255; 264/134; 264/135; 264/259; 264/328.6; 264/328.16; 264/331.19; 264/338; 428/425.6
[58] Field of Search ............... 264/134, 255, 259, 261, 264/328.6, 328.16, 331.19, 338, 135; 428/425.6

[56] References Cited

U.S. PATENT DOCUMENTS

| 3,501,564 | 3/1970 | Snoeyenbos et al. ....... 264/331.19 X |
| 3,979,548 | 9/1976 | Schäfer et al. ..................... 428/425.6 |
| 4,232,080 | 11/1980 | Orain et al. ........................... 428/215 |
| 4,350,739 | 9/1982 | Mohiuddin .................... 264/328.6 X |
| 4,590,030 | 5/1986 | Gillner et al. .................. 264/331.19 |
| 4,600,653 | 7/1986 | Washita et al. .................. 428/425.6 |
| 4,652,494 | 3/1987 | Bravet et al. .............. 264/331.19 X |

FOREIGN PATENT DOCUMENTS

| 38760 | 10/1981 | European Pat. Off. . |
| 54491 | 6/1982 | European Pat. Off. . |
| 131523 | 1/1985 | European Pat. Off. ......... 428/425.6 |
| 132169 | 1/1985 | European Pat. Off. ....... 264/331.19 |
| 2187719 | 1/1974 | France . |
| 2251608 | 6/1975 | France . |
| 2398606 | 2/1979 | France . |
| 59-135216 | 8/1984 | Japan ............................... 428/425.6 |
| 60-25719 | 2/1985 | Japan ................................... 264/259 |
| 1576394 | 10/1980 | United Kingdom . |
| 2074940 | 11/1981 | United Kingdom ............. 428/425.6 |

Primary Examiner—Jeffery Thurlow
Assistant Examiner—Leo B. Tentoni
Attorney, Agent, or Firm—Oblon, Fisher, Spivak, McClelland & Maier

[57] ABSTRACT

A process for the production of a safety pane comprising a sheet of glass and at least one polyurethane-based layer having energy-absorbent properties. The polyurethane-based layer having energy-absorbent properties is formed directly on the sheet of glass by the reactive injection, under a pressure between 2 and 10 bars, between said sheet of glass and a rigid countermold, of a reactive mixture of an isocyanate component having a viscosity under 5000 centipoises at 40 degrees C. and a polyalcohol component, with the isocyanate component containing at least one aliphatic or cycloaliphatic diisocyanate, or a prepolymer of these isocyanates, with the polyalcohol component containing at least one long difunctional polyalcohol having a molecular mass between 500 and 4000 and at least one short diol as a chain extending agent.

18 Claims, No Drawings

PROCESS AND DEVICE FOR THE PRODUCTION OF A SAFETY PANE

BACKGROUND OF THE INVENTION

1. Field of the Invention

This invention pertains to the production of a compound safety pane comprising at least one sheet of glass and at least one layer of plastic material presenting energy-absorbent properties.

2. Background of the Prior Art

Compound safety panes containing a sheet of glass and at least one layer of plastic material have already been described in numerous publications.

Thus, French patent publication 2 398 606 describes a compound pane containing a glass sheet, a layer of plastic material having energy-absorbent properties, formed from a diisocyanate and at least one polyesterdiol or polyetherdiol, with the ratio of equivalent NCO groups to equivalent OH groups being preferably between 0.8 and 0.9, and a layer of plastic material having good surface properties, especially good resistance to scratching and abrasion. This pane, which is especially utilized as a motor vehicle windshield, maintains its good optical properties and the adhesion between the elements remains good under highly variable conditions of temperature and humidity, but the bio-mechanical properties of the pane and especially the resistance to shock are not entirely satisfactory.

Moreover, through European patent publication 0 054 491, a compound pane having the structure described above is known, which utilizes plastic material having energy-absorbent properties as the inserted layer, a polyurethane-polyurate-based layer presenting a linear structure and a carbamide group content of about 1 to 20% by weight, with this polyurethane-polyurate being the reactive product of a prepolymer coming from a polyalcohol component and an isocyanate component taken in excess, with at least one diamine. This inserted layer is produced by the extrusion of a polyurethane polyurate resin or by pouring a solution of said resin and evaporating the solvents, which, in both cases, requires several successive operations.

In the case of the extrusion, it is necessary to conduct a prior synthesis of the resin so that it can be extruded.

Moreover, to obtain the necessary optical quality for the intended application, the sheet must be "pressed". This optical quality obtained, moreover, does not generally last over time because the plastic material retains its production process in memory, and the quality produced by the "pressing" is reduced over time.

In addition, the extrusion of the layer having the energy-absorbent properties presents a problem of assembly with the self-repairing layer.

In the case in which the solution is poured, it is also necessary to conduct a prior synthesis of the resin. Next, the resin must be dissolved in a solvent, then the solution must be poured and the solvent must be evaporated in a repetitive manner to obtain a layer whose thickness is compatible with the desired energyabsorbent nature. The evaporation of the solvent also constitutes a source of harmful effects.

The invention obviates the drawbacks which have been mentioned and proposes a process for the production of a safety pane utilized especially as a vehicle windshield, which presents good optical and bio-mechanical properties and which maintains said properties under variable conditions of temperature and humidity.

SUMMARY OF THE INVENTION

The pane produced according to the process of the invention, like the aforementioned known panes, comprises a sheet of glass which can be hardened, or annealed, a layer of plastic material having energyabsorbent properties, if needed, a layer of scratch and abrasion-resistant self-repairing coating, or one or several other layers made of glass or plastic material.

The process according to the invention consists of directly forming the layer having energy-absorbent properties on the sheet of glass by a reactive injection process, under a pressure between about 2 and 10 bars, between said glass sheet and a rigid countermold, of a reactive mixture of an isocyanate component and a component having active hydrogens, especially a polyalcohol component, with the isocyanate component containing at least one aliphatic diisocyanate, cycloaliphatic diisocyanate or a prepolymer of these diisocyanates, with this component having a viscosity under about 5000 centipoises at +40 degrees C., with the polyalcohol component containing at least one long difunctional polyalcohol having a molecular mass between 500 and 4000 and at least one short diol as a chain extending agent. Reactive injection is defined as the introduction, under a pressure between about 2 and 10 bars, into the mold, of a liquid mixture of the reactive components in the monomer or prepolymer state, followed by a polymerization of this mixture in the mold, by heat. This reactive injection, which affords the layer its good mechanical and optical properties, will be described more completely below.

DETAILED DESCRIPTION OF THE INVENTION

The proportions of the polyurethane components are chosen to preferably obtain a stoichiometrically balanced system, i.e., that the ratio of the NCO equivalent groups provided by the diisocyanate components to the OH equivalent groups provided by the polyalcohol component, i.e., the long polyalcohol(s) and the short diol(s) is about 1. When the NCO/OH ratio is less than 1, the more it decreases the more the desired mechanical properties for the application quickly become unsatisfactory. When all of the polyurethane components are difunctional, the lower limit of the NC O/OH ratio to obtain the satisfactory mechanical properties is located at about 0.9. When at least one of the components is trifunctional, this lower limit can be decreased to about 0.8. When the NCO/OH ratio is greater than 1, the more it increases and the more certain mechanical properties of the layer formed by reactive injection are reinforced, for example, the layer becomes more rigid, but, given the higher cost of the isocyanate component with respect to that of the polyalcohol component, the choice of these NCO/OH ratios which is approximately equal to 1 is a good compromise between the properties obtained and the cost.

The proportions between the long polyalcohol and the short diol can vary as a function of the desired properties and also of the ratio of the equivalent groups, with the number of the OH equivalent groups due to the short diol, however, generally representing 20 to 70% of the total equivalent groups of the mixture forming the polyalcohol component in the case in which the ratio of the NCO equivalent groups to the OH groups is about 1. When the proportion of the short diol is increased, the layer is hardened and its module is generally increased.

The appropriate diisocyanates utilized within the framework of the invention are chosen especially from the following aliphatic difunctional isocyanates: hexamethylenediisocyanate (HMDI), 2,2,4-trimethyl-1,6-hexanediisocyanate (TMDI), bis 4-isocyanatocyclohexylmethane (Hylene W), bis 3-methyl-4-isocyanatocyclohexylmethane, 2,2 bis (4-isocyanatocyclohexyl) propane, 3-isocyanatomethyl-3,5,5-trimethylcyclohexylisocyanate (IPDI), mxylylenediisocyanate (XDI), m- and p-tetramethylxylylenediisocyanate (m- and p-TMXDI), trans-cyclohexane-1,4 diisocyanate (CHDI), 1,3 (diisocyanatomethyl)- cyclohexane (hydrogenated XDI).

Preferably, IPDI is used alone or in a mixture, especially for reasons of manufacturing cost.

Under one of the aspects of the invention, an isocyanate component containing carbamide functions is utilized. These carbamide functions improve certain mechanical properties of the layer. The proportion of carbamide can represent up to about 10% of the total weight of the isocyanate component having carbamide functions. Preferably, the carbamide content is between 5 and 7% of the total weight of said component. For the aforementioned reason, utilization is preferably alone or in a mixture of 3-isocyanato-methyl-3,5,5 trimethylcyclohexylisocyanate having carbamide functions (IPDI and derivatives).

The suitable long polyalcohols are chosen from the polyetherdiols or polyesterdiols having a molecular mass between 500 and 4000; with the polyesterdiols being the products of the esterification of a diacid such as adipic, succinic, palmitic, azelaic, sebacic, O-phtalic acids and a diol such as ethyleneglycol, propanediol-1,3, butanediol - 1,4, hexanediol- 1,6, with the polyetherdiols having the general formula

H[O (CH2)n]m OH with n=2 to 6; m such that the molecular mass is located between 500 and 4000, or the polyetherdiols having the general formula

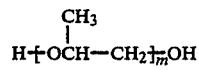

$$H\text{-}(OCH\text{---}CH_2)_m\text{OH}$$
$$\ \ \ \ \ \ \ \ \ \ \ |$$
$$\ \ \ \ \ \ \ \ CH_3$$

with m such that the molecular mass is also between 500 and 4000. The polycaprolactonediols can also be utilized.

Preferably, a polytetramethyleneglycol (n =4) having a molecular mass of 1000 is used.

The suitable chain extending agents are short diols having a molecular mass under about 300 and preferably under 150, such as: ethyleneglycol, 1,2 propanediol; 1,3 propanediol; 1,2 butanediol; 1,3-1,4 dimethyl-2,2 propanediol; 1,3 (neopentylglycol); 1,5 pentanediol; 1,6 hexanediol, 1,8 octanediol; 1,10 decanediol; 1,12 dodecanediol; 1,12 cyclohexanedimethanol; bisphenol A; 2-methyl 2,4-pentanediol; 3-methyl, 2,4-pentanediol; 2-ethyl 1,3-hexanediol; 2,2,4-trimethyl 1,3-pentanediol; diethyleneglycol; triethyleneglycol; tetraethyleneglycol; 2-butyne 1,4-diol; 1,4-butenediol and decynediol, substituted and/or etherified, hydroquinone-bis-hydroxyethylether, bisphenol A, etherified by two or four propylene oxide groups, dimethylolproponic acid. In general, the shorter the diol, the harder the layer.

Preferably, 1,4-butanediol is used, which is a good compromise to obtain a layer which is neither too hard nor too supple, which is sought for this type of application as an energyabsorbent.

One of the characteristics of the layer having energyabsorbent properties is that it is formed by reactive injection.

This reactive injection, in the case in which the initial components are difunctional, provides a layer which is not entirely thermoplastic when the NCO/OH group ratio is approximately equal to 1.

Reactive injection involves a rapid polymerization reaction so that the layer is formed in time periods which are suitable for industrial production. This requires a high temperature of about 80 to 150 degrees C., a temperature at which the secondary branching reactions occur, creating, for example, allophanate groups and/or biurets between the urethane chains, such as:

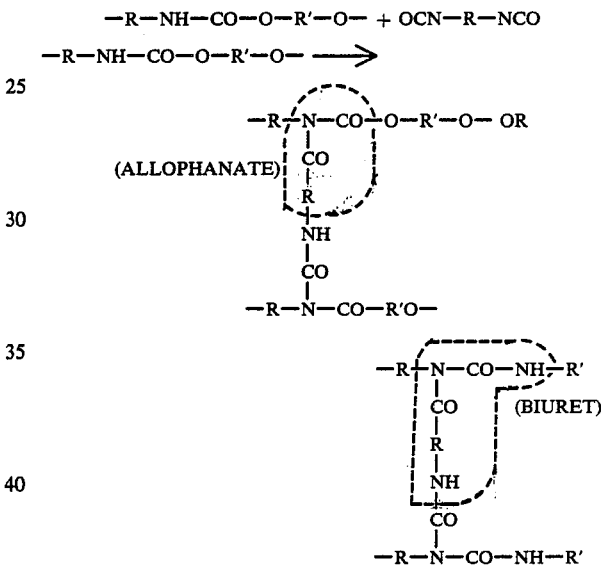

Under these conditions, even with difunctional components, when the NCO/OH ratio is approximately equal to 1 as indicated above, the product obtained is not completely thermoplastic, in fact, it cannot be melted and is insoluble in most of the polyurethane solvents such as tetrahydrofuran, or dimethylforamide. From this is drawn the advantage of improved mechanical properties with an equal formulation with respect to an equivalent low-temperature polymerized system in which only a linear polycondensation occurs.

When the NCO/OH ratio is substantially less than one and below about 0.8 to 0.9, cross-linkage of the above-described type occurs only in an insignificant manner.

The polyalcohol component can contain a proportion of at least one polyalcohol having a functionality which is greater than two and especially aliphatic triol monomers such as glycerol, trimethylolpropane, triols having polyether chains, polyprolactone triols, with the molecular mass of these triols being generally between 90 and 1000, combined polyether/polyester polyalcohols having functionalities greater than 2 for example, having functionality between 2 and 3. The addition of a polyalcohol having a functionality greater than 2 causes supplementary coupling bonds between the polyurethane chains and can thus further improve the cohesion of the layer.

The proportions between the long polyalcohol, the short diol and possibly the polyalcohol having a functionality greater than 2 can vary depending on the desired properties. Generally, proportions are chosen such that, for a hydroxyl equivalent, the long polyalcohol represents about 0.30 to 0.45 equivalent, the short diol about 0.2 to 0.7 equivalent and the polyalcohol having a functionality greater than 2 about 0 to 0.35 equivalent.

According to another formation of the energy absorbing layer according to the invention, the isocyanate component can contain limited proportions, for example, under 10% in HCO equivalents, at least one triisocyanate, such as a biuret of isocyanate or a triisocyanurate.

Under one aspect of the invention, a part of the polyalcohol component can be replaced by an active hydrogen product such as an amine.

To form the energy absorbent layer according to the invention, the reactive mixture is injected under pressure into a mold formed by a sheet of glass utilized as a component of the pane and a rigid countermold, which can be monolithic or compound, comprising, for example, elements made of glass and/or plastic material or metal, with the countermold as a part of its constituent elements, if needed, also being able to enter into the composition of the pane to be produced.

The injection pressure of the reactive mixture can vary as a function of the reaction mixture chosen, the thickness of the layer to be formed and the size of the pane. Generally, a pressure from 2 to 10 bars is utilized, and preferably, 2 to 3 bars.

When a pane is produced according the invention, being comprised only of a glass sheet and the energy absorbing (EA) layer, the surface of the countermold is treated with a separating agent which allows the countermold to be separated from the pane which has been produced after the polymerization of the EA layer. As a mold removal agent, for example, solutions of silicone, vegetable waxes or a modified ethylene oxide additive product such as described for example in French patent publication 2 383 000, can be utilized.

According to the process of the invention, a three-layer pane can also be advantageously produced, specifically a pane which, in addition to the glass sheet and the EA layer, comprises a coating of plastic material having improved surface properties and especially a good resistance to scratching and abrasion. According to one characteristic of the invention, this layer can be formed by the reactive injection of the reactive components of said layer, after the EA layer is formed, as described in greater detail below. In an advantageous variation, the coating layer is formed in advance, this layer is deposited on the inside surface of the countermold which has been previously coated with an appropriate mold removal agent which can be one of those described above, and subsequently, this countermold, coated with the layer having the surface properties, is utilized for the formation of the EA layer by reactive injection, such that the EA layer is injected directly between the two other components of the pane to be produced, namely the glass sheet and the layer of plastic covering material, and after the polymerization of the EA layer and after the mold is removed, the three-layer pane is directly obtained.

The plastic scratch-resistant self-repairing coating layer which is designated as the internal protection layer (IP layer) possesses a composition, for example, such as that which is described in French patent publications No. 2 187 719 and 2 251 608. Under normal temperature conditions, this self-repairing layer has a high elastic deformation capacity, a low elasticity module, which is under 2000 daN/cm2 and is preferably under 200 daN/cm2, and a rupture extension of over 60% with less than 2% plastic deformation and preferably a rupture extension of more than 100% with less than 1% plastic deformation. The preferred layers of this type are polyurethanes which can be thermo-hardened having an elasticity module of about 25 to 200 daN/cm2 and an extension of about 100 to 200% with less than 1% plastic deformation.

Examples of monomers which are suitable for the preparation of these polyurethanes which can be thermo-hardened, especially by reactive spraying according to the invention are on the one hand, the difunctional aliphatic isocyanates such as 1,6 hexanediisocyanate, 2,2,4-trimethyl-1,6-hexanediisocyanate, 2,4,4-trimethyl-1,6-hexanediisocyanate, 1,3-bis (isocyanatomethyl) benzene, bis (4-isocyanatocyclohexyl) methane, bis (3-methyl-4-isocyanatocyclo- hexyl) methane, 2,2 bis (4-isocyanatocyclohexyl) propane and 3-isocyanatomethyl-3,5,5-trimethyl-cyclohexylisocyanate, as well as the biurets, isocyanurates and prepolymers of these components having a functionality greater than 2 and, on the other hand, the polyfunctional polyalcohols, for example, the branched polyalcohols such as the polyester polyalcohols and polyether polyalcohols obtained by the reaction of polyfunctional alcohols, especially 1,2,3-propanetriol (glycerol), 2,2-bis (hydroxymethyl)1-propanol (trimethylolethane), 2,2, bis (hydroxymethyl)-1-butanol (trimethylol-propane), 1,2,4-butane-triol, 1,2,6-hexane triol, 2,2-bis (hydroxymethyl)-1,3-propanediol (pentaerythritol) and 1,2,3,4,5,6-hexane-hexol (sorbitol), with aliphatic diacids such as malonic acid, succinic acid, glutaric acid, adipic acid, suberic acid, and sebacic acid or with cyclic ethers, such as ethylene oxide, oxide of 1,2-propylene and tetrahydrofurane.

The molecular weight of the branched polyalcohols is advantageously about 250 to 4000 and preferably about 450 to 2000. Mixtures of different polyisocyanates and polyalcohol monomers can be utilized. An especially preferable polyurethane which can be thermo-hardened is that which is described in French patent publication 2,251,608.

For the prior formation of the coating layer, the procedure according to the invention is advantageously followed by forming this layer directly on the countermold, which then become previously coated with a mold formation support, which has been previously coated with a mold removal agent. For this purpose, the IP layer can be formed directly by a reactive spraying on the countermold of the reactive mixture of the components followed by a polymerization of the sprayed layer.

The spraying can be done utilizing any spraying system which produces a layer which is homogeneous in thickness as well as in composition. The spraying can be electrostatic or another type.

Advantageously, the spraying is a high-speed centrifuge spraying which is effected through the use of a spray head such as a bowl turning at a speed between 1000 and 80000 revolutions per minute. For example, the process and the turning bowl described in French patent application No. 8406783 can be utilized.

To prevent a premature polymerization, the reactive mixture of the polyalcohol component and the isocyanate component is advantageously formed directly in the spray head.

Under one advantageous aspect of the invention, the spraying is done on the countermold, which has been preheated. Thus, a good layering is obtained, for example, when the temperature of the support is between about 25 degrees C. and 70 degrees C.

When the pane is utilized as a motor vehicle windshield, the layer having the energy-absorbent properties (EA layer), formed by reactive injection, generally presents a thickness which is greater than about 0.4 mm. For other applications, this thickness can possibly be reduced. The thickness of the IP layer can vary more widely, being between about 0 and 0.5 mm and preferably between about 0.02 and 0.4 mm.

The layer having energy-absorbent properties and, if needed, the IP layer can contain various additives which generally serve to facilitate their production by reactive spraying, or which can possibly further improve some of their properties.

They can contain a catalyst such as a tin catalyst, for example, tin dibutyldilaurate, tributyltin oxide, tin octoate, an organomercuric catalyst, for example phenyl mercuric ester, an amine catalyst such as diazabicyclo-(2,2,2)-octane, 1,8 diazabicyclo (5,4,0)-1 decene-7.

These layers can contain a stabilizer such as bis (2,2,6,6-tetramethyl-4 piperidyl) sebacate, a phenolic anti-oxidant.

They can also contain a layering agent such as a silicone resin, a fluoroalkyl ester, an acrylic resin.

Moreover, according to the invention, a complex pane can be advantageously produced, by combining, during the formation of the EA layer by reactive injection, a compound group or compound sheet containing at least two layers of plastic material which has previously been deposited on the countermold, coated with a separating agent. Thus, a pane containing a glass sheet, an EA layer, a sheet made of plastic material, for example, a sheet reinforcing the properties of the EA layer, especially made of polyethylene glycol terephtalate, and a IP layer can be produced. For this purpose, the compound sheet is formed, for example, by a reactive spraying of the components of the IP layer on the sheet of plastic material, or by reactive pouring of the components of the IP layer as described, for example, in European patent publication 0 038 760. The compound sheet formed is placed on the countermold, which has previously been coated with a mold removal agent, with the IP layer facing the countermold, and the components of the EA layer are injected between the glass sheet, the pane element, which is utilized as a mold, and the compound sheet of plastic material placed on the countermold.

The reactive injection according to the invention also applies to the production of an inserted layer of a compound pane containing two glass sheets. In this case, the reactive mixture is injected directly between the two sheets of glass of the pane, which act as mold and countermold.

The thickness of the EA layer obtained by reactive injection is determined by the spacing between the mold and the countermold.

In one embodiment of the process, blocks having the thickness equal to the desired spacing are placed on the periphery of the mold or countermold. A peripheral seal cord can be provided. Several passages through the peripheral cord may be presented with some allowing the introduction under pressure of the reactive mixture, and others allowing air and gasses to escape.

Additional means can be provided to offset the internal pressure and prevent the mold and the countermold from separating during the injection. For this purpose, fixed rods or jack rods endowed with a suction cup at their moving end, placed at determined locations, pressing against the mold and countermold, can be utilized.

Other advantages and characteristics of the invention will emerge in the following description of an example of the implementation of the process.

EXAMPLE 1

Following the process in accorance with the invention, a safety pane made of a convex sheet of glass, which is 3 mm thick, and a layer of plastic material having energy absorbent properties (EA layer), which is 0.480 mm thick, is formed.

The mixture to be injected, which is suitable for forming the EA layer, is made from a polyalcohol component and an isocyanate component. The polyalcohol component is prepared in advance by mixing polytetracomponent methylene glycol having a molecular mass of 1000 with 1,4-butanediol and polycaprolactonetriol having a molecular mass of 300, with the proportions of the constituents being such that the polytetramethyleneglycol supplies 0.35, the 1,4-butanediol supplies 0.55 and the polycaprolactonetriol supplies 0.1 in hydroxyl group equivalents.

A stabilizer is incorporated with the polyalcohol in a proportion of 0.5% by weight of the total mass of the polyalcohol component and the isocyanate component, a layering agent in a proportion of 0.05% by weight, calculated in the same manner, and a dibutyltin dilaurate catalyst in a proportion of 0.02% by weight, calculated in the same manner as above.

The isocyanate component utilized is 3-isocyanatomethyl 3,5,5, trimethylcyclohexylisocyanate (IDIP) presenting carbamide functions obtained by partial hydrolysis of the IPDI and having an NCO group content of about 31.5% by weight.

The components are taken in quantities such that the NCO/OH ratio is 1.

This mixture is injected into a mold placed approximately horizontally, formed of a sheet of glass and a countermold which also consists of a sheet of glass having the same convexity, which has been previously treated with a separation agent, namely a silicone solution. On the periphery of the mold, a block in the form of a cylindrical rod determines the spacing between the two glass sheets. Attached to this block, a polyvinyl chloride washer ensures the seal.

During the injection, pressure is 3 bars and the temperature of the reactive mixture is 45 degrees C.

Rods equipped with suction cups keep the two sheets of glass at the desired distance apart during the injection. The injection is made at a point located in the middle of a long side of the pane, while four escape openings are provided in the four corners of the pane. After the injection, the mold is heated to 120 degrees C. for about 20 minutes.

The pane which is produced after the mold is removed presents an excellent optical quality and perfect transparentness.

The adherence obtained between the glass sheet and the layer of plastic material is measured through the use of a peeling test described below.

A band, which is 5 cm wide, is cut on the coating layer. The end of the band is pulled away and traction is applied to it, perpendicular to the surface of the pane, at a speed of 5 cm per minute. The operation is conducted at +20 degrees C. The average traction force necessary to pull the band away is noted. Through the use of this process, a traction force of 11 daN/5cm is obtained.

Shock resistance tests at different temperatures are performed on panes produced according to the example.

A first shock resistance test is effected at +20 degrees C with a steel ball weighing 2.260 kg (large ball test) which is made to drop on the center portion of the sample compound pane having a 30.5 cm side, supported on a rigid frame. The approximate height is determined for which 90% of the samples tested at the chosen temperature resist the drop of the ball without being penetrated.

For the compound pane in accordance with the example, the value obtained is 5 meters.

Another shock resistance test is effected with a steel ball weighing 0.227 kg (small ball) which is 38 mm in diameter. A test is performed at a temperature of −20 degrees C. Another test is conducted at a temperature of +40 degrees C. The values obtained are respectively 13.5 and 9 meters.

These values are sufficient to meet European standard R43 in effect, with the desired results being at least 4 meters with the large ball, at least 8.5 meters with the small ball at 20 degrees C. and at least 9 meters with the small ball at +40 degrees C.

EXAMPLE 2

It is desired to produce a safety pane made of a convex glass sheet, which is 3 mm thick, with a layer of plastic material having energy-absorbent properties (EA layer), which is 0.550 m thick, and a layer of plastic material having surface properties (IP layer), which is 0.070 mm thick.

The reactive mixture utilized to form the EA layer is the same as that which is utilized in example 1.

The reactive mixture utilized to form the IP layer is made from a polyalcohol component and an isocyanate component in the presence of a stabilizer, a catalyst and a layering agent taken in the following proportions:

100 g of a polyether polyalcohol having a molecular weight of about 450 obtained by condensation of 1,2-propylene oxide with 2,2-bis (hydroxymethyl)-1-butanol and having a free hydroxyl radical content of about 10.5 to 12%,
 5.2 g of a UV stabilizer,
 0.05 g of dibutyltin dilaurate as a catalyst and 0.2 g of a fluoroalkyl ester as a layering agent,
 102 g of a biuret of 1,6-hexamethylenediisocyanate having a free isocyanate radical content of about 23.2%.

The polyalcohol component presents a viscosity of about 620 centipoises at 25 degrees C., while the isocyanate component presents a viscosity of about 2300 centipoises. The stabilizer, the catalyst and the layering agent are added to the polyalcohol component in advance.

The glass sheet serving as the countermold is previously spray-coated with the reactive mixture to form the IP layer. For this purpose, the glass sheet is placed horizontally on a support adapted to its shape and the complex is placed on a conveyor. The glass sheet is first brought to a post to be treated with a spraying of the separating agent. It is then brought into a compartment for the formation of the IP layer. Here, the sheet is sprayed with the reactive mixture described above. The spraying is effected through the use of a bowl turning at a speed of about 20,000 revolutions per minute, with the diameter of the bowl being about 65 mm. Thus, a IP layer which is about 0.070 mm thick is formed, which is polymerized in a polymerization tunnel in which the pane is exposed to a temperature of about 100 degrees C. for 20 minutes. The glass sheet coated with the IP layer is next utilized as a countermold for the formation by reactive injection of the EA layer as described in example 1.

The pane obtained after the mold is removed is formed of three layers, namely: the glass sheet utilized as the mold, the EA layer and the IP layer, which adheres firmly to the EA layer.

The pane obtained presents a good optical quality and its mechanical characteristics are as follows:
 the peeling test provides a value of 11 daN/5 cm,
 the large ball test and the two small ball tests give the respective values of 5, 13.5 and 10 meters.

The scratch resistance of the IP layer is measured according to the test known as the "Mar Resistance Test", performed with the ERICHSEN apparatus, type 413. The load to be applied to a diamond head to introduce a permanent scratch on the layer of plastic coating material is measured. Here, scratch resistance is 20 g.

The abrasion resistance of the IP layer is measured according to European standard R 43. For this purpose, the pane coated with the IP protection layer is subject to abrasion through the use of an abrasive wheel. After 100 abrasive turns, the difference in cloudiness between the part which has undergone abrasion and the untreated part is measured using a spectrophotometer. The cloudiness difference must be under 4%. The value obtained for the pane according to the invention is 3.5%.

EXAMPLE 3

It is desired to produce a three-layer pane as in example 2, except that the IP layer, which is 0.3 mm thick, is formed by reactive injection in the same manner as with the EA layer, which, itself, is 0.5 mm thick.

For this purpose, the EA layer is formed as in example 1. Then, after the modification of the thickness of the blocks determining the spacing between the mold and the countermold, the IP layer is formed by reactive injection, using a procedure similar to the formation of the EA layer, utilizing the same conditions of temperature and pressure.

The pane which is produced presents the desired characteristics.

EXAMPLE 4

It is desired to produce a pane formed of a sheet of glass which is 3 mm thick, an EA layer which is 0.4 mm thick, a plastic reinforcement sheet, especially made of polyethylene glycol terephtalate, which is 0.1 mm thick and a IP layer, which is 0.07 mm thick.

For this purpose, the polyethyleneglycol terephtalate sheet is placed on the countermold surface, which has been previously coated with the IP layer through the implementation, for example, of a reactive spraying as described in example 2, or by reactive pouring, as described, for example in European patent publication No. 00 38 760, then the reactive mixture suitable to form the EA layer is injected under a pressure of 3 bars, as described in example 2.

EXAMPLE 5

It is desired to produce a compound pane comprising two glass sheets and one EA layer as an inserted layer. Procedures are followed as described in example 1, except that the glass sheet which serves as a countermold does not undergo prior treatment with a mold removal agent.

What is claimed as new and desired to be secured by Letters Patent of the United States is:

1. Process for the production of a compound pane comprising a glass sheet and a transparent polyurethane-based layer thereon having energy-absorbent properties, characterized in that the polyurethane-based coating layer having energy absorbent properties is formed directly on the glass sheet by reactive injection molding, under a pressure between 2 and 10 bars, between said glass sheet and a rigid countermold, of a reactive mixtures of an isocyanate component having a viscosity under 5000 centipoises at 40 degrees C. and a polyalcohol component, with the isocyanate component containing at least one aliphatic or cycloaliphatic diisocyanate or a prepolymer of these isocyanates, with the polyalcohol component containing at least one long difunctional polyalcohol having a molecular mass between 500 and 4000 and at least one short diol as a chain extending agent and after polymerization of the reaction mixture, the countermold is removed.

2. Process according to claim 1, wherein the isocyanate componeny contains carbamide functions, with the carbamide content at most 10% of the total weight of the isocyanate component.

3. Process of claim 2, wherein the carbamide content is between 5–7%.

4. Process according to claim 1 wherein the isocyanate component contains 3-isocyanatomethyl3,5,5-trimethylcyclohexylisocyanate.

5. Process according to claim 1 wherein the isocyanate component and the polyalcohol component of the polyurethane having energy-absorbent properties are taken in a quantity such that the ratio of the isocyanate equivalent groups to the equivalent hydroxyl groups is about equal to 1.

6. Process according to claim 1 wherein the proportions between the different polyalcohols are chosen such that the number of hydroxyl equivalent groups due to the short diol represents 20 to 70% of the total of the hydroxyl groups when the NCO/OH ratio is about 1.

7. Process according to claim 1 wherein the isocyanate component is formed essentially of 3-isocyanatomethyl- 3,5,5-trimethylcyclohexylisocyanate presenting carbamide groups and the polyalcohol component is formed essentially of polytetramethyeneglycol having a molecular mass of about 1000 and of butanediol - 1,4.

8. Process according to claim 1, wherein the polyalcohol component in addition comprises at least one polyalcohol having a functionality greater than 2.

9. Process according to claim 7, characterized in that the polyalcohol having a functionality greater than 2 is a triol.

10. Process according to claim 1 wherein for a total hydroxyl equivalent for a polyurethane polyalcohol component having energy absorbent properties, the long polyalcohol represents 0.30 to 0.45 equivalent, the short diol 0.2 to 0.7 equivalent and a polyalcohol having functionality greater than 2 from 0 to 0.35 equivalent.

11. Process according to claim 1, wherein the polyurethane layer having energy-absorbent properties contains additives including at least one of a catalyst, a layering agent, and a stabilizer.

12. Process according to claim 1, wherein the reactive mixture is injected into the mold with a pressure of 2 to 3 bars.

13. Process according to claim 1 wherein the layer having energy-absorbent properties is combined during the molding with at least one other layer made of glass or plastic material.

14. Process according to claim 13, wherein the other layer is made of plastic material having superior surface properties.

15. Process according to claim 13, wherein the layer having superior surface properties is formed in advance and is placed on the countermold.

16. Process according to claim 14, wherein the layer having superior surface properties is formed in advance by reactive spraying.

17. Process according to claims 14, wherein the layer having surface properties is formed by reactive spraying on the countermold, which has been previously treated with a separating agent.

18. Process according to claim 12, wherein the injected layer is combined during the molding with a compound structure, comprising a reinforcement sheet made of plastic material, which has been previously coated with a layer having superior surface properties.

* * * * *